United States Patent
Zhou

(10) Patent No.: US 7,515,876 B2
(45) Date of Patent: Apr. 7, 2009

(54) RAKE RECEIVER WITH TIME-SHARED FINGERS

(75) Inventor: Gongyu Zhou, North Epping (AU)

(73) Assignee: Agere Systems Inc., Allentown, PA (US)

( * ) Notice: Subject to any disclaimer, the term of this patent is extended or adjusted under 35 U.S.C. 154(b) by 362 days.

(21) Appl. No.: 11/121,323

(22) Filed: May 3, 2005

(65) Prior Publication Data

US 2006/0251155 A1 Nov. 9, 2006

(51) Int. Cl.
H04B 1/00 (2006.01)
H04B 15/00 (2006.01)

(52) U.S. Cl. .............. 455/65; 455/67.11; 455/63.3; 455/101; 455/296; 455/114.2; 375/148; 375/150; 375/346; 375/147; 375/152; 370/335; 370/342; 370/441

(58) Field of Classification Search .............. 455/65, 455/101, 63.3, 67.11, 506; 375/147, 148, 375/150, 346, 347, 349, 152; 370/336, 441, 370/335

See application file for complete search history.

(56) References Cited

U.S. PATENT DOCUMENTS

| | | | | |
|---|---|---|---|---|
| 6,041,073 | A * | 3/2000 | Davidovici et al. | 375/148 |
| 6,130,923 | A * | 10/2000 | Levin et al. | 375/347 |
| 6,173,008 | B1 * | 1/2001 | Lee | 375/148 |
| 6,185,199 | B1 * | 2/2001 | Zehavi | 370/335 |
| 6,215,814 | B1 * | 4/2001 | Ylitalo et al. | 375/148 |
| 6,269,075 | B1 * | 7/2001 | Tran | 370/206 |
| 6,459,883 | B2 * | 10/2002 | Subramanian et al. | 455/67.11 |
| 6,618,434 | B2 * | 9/2003 | Heidari-Bateni et al. | 375/148 |
| 6,625,197 | B1 * | 9/2003 | Lundby et al. | 375/130 |
| 6,901,105 | B1 * | 5/2005 | Razzell | 375/148 |
| 6,934,319 | B2 * | 8/2005 | Subramanian | 375/142 |
| 6,947,475 | B2 * | 9/2005 | Sendonaris et al. | 375/148 |
| 6,950,456 | B2 * | 9/2005 | Lee et al. | 375/146 |
| 7,031,373 | B1 * | 4/2006 | Iyer | 375/148 |
| 7,042,862 | B1 * | 5/2006 | Hirade | 370/335 |
| 7,054,396 | B2 * | 5/2006 | Shan | 375/346 |
| 7,061,967 | B2 * | 6/2006 | Schelm et al. | 375/147 |
| 7,061,971 | B2 * | 6/2006 | Ulupinar et al. | 375/148 |
| 7,088,955 | B2 * | 8/2006 | Challa et al. | 455/63.3 |
| 7,103,091 | B2 * | 9/2006 | Cervini | 375/147 |

(Continued)

OTHER PUBLICATIONS

"VLSI Implementation Of Rake Receiver For IS-95 CDMA Testbed Using FPGA," Oliver Leung, Chi-ying Tsui and Roger S. Cheng, IEEE 2000, pp. 3-4.

Primary Examiner—Marceau Milord
(74) Attorney, Agent, or Firm—Mendelsohn & Assoc., P.C.; Kevin M. Drucker; Steve Mendelsohn

(57) ABSTRACT

A rake receiver for processing a multi-path input signal received from a communications channel, wherein each multi-path component of the multi-path input signal comprises one or more symbols, comprises a plurality of fingers and a demodulator. Each of the plurality of fingers is adapted to receive the multi-path input signal and provide a sequence of input samples corresponding to a multi-path component of the multi-path input signal. The demodulator is adapted (i) during a single clock period, to receive and process one or more input samples corresponding to only one of the fingers, (ii) for each of the fingers, to accumulate multiple processed input samples to form a symbol, and (iii) to provide the formed symbols for all fingers.

14 Claims, 8 Drawing Sheets

U.S. PATENT DOCUMENTS

| | | | |
|---|---|---|---|
| 7,133,436 B2 * | 11/2006 | Araya et al. | 375/148 |
| 7,142,585 B2 * | 11/2006 | Baltersee et al. | 375/148 |
| 7,154,872 B2 * | 12/2006 | Hsuan | 370/335 |
| 7,155,177 B2 * | 12/2006 | Jootar et al. | 455/101 |
| 7,184,462 B1 * | 2/2007 | Atarius et al. | 375/148 |
| 7,184,496 B2 * | 2/2007 | Eckhardt et al. | 375/343 |
| 7,190,749 B2 * | 3/2007 | Levin et al. | 375/346 |
| 7,194,051 B2 * | 3/2007 | Li et al. | 375/349 |
| 7,203,220 B2 * | 4/2007 | Baltersee et al. | 375/145 |
| 7,221,699 B1 * | 5/2007 | Lindskog | 375/147 |
| 7,230,975 B2 * | 6/2007 | Subrahmanya et al. | 375/148 |
| 7,236,515 B1 * | 6/2007 | Pope | 375/147 |
| 7,245,653 B2 * | 7/2007 | Peng | 375/148 |
| 7,308,019 B2 * | 12/2007 | Bottomley et al. | 375/142 |
| 7,310,367 B2 * | 12/2007 | Li et al. | 375/147 |
| 7,327,779 B1 * | 2/2008 | Lugil et al. | 375/141 |

\* cited by examiner

FIG. 8

| PRIOR ART TIME MULTIPLEX | f0 | f1 | f2 | f3 | f0 | f1 | f2 | f3 | f0 | f1 | f2 | f3 | f0 | f1 | f2 | f3 |

| INVENTION | f0 | f1 | f2 | f3 |
|---|---|---|---|---|
| | chip period 0 | chip period 1 | chip period 2 | chip period 3 |

RAKE RECEIVER WITH TIME-SHARED FINGERS

BACKGROUND OF THE INVENTION

1. Field of the Invention

The present invention relates to wireless receivers, and, in particular, to rake receivers for processing a signal that has been subjected to a multi-path channel.

2. Description of the Related Art

When a signal travels through a real-world environment, it often reaches a receiver by multiple paths. These paths occur as a result of the signal reflecting, diffracting, and scattering from various elements in the environment, e.g., mountains, trees, and buildings. Multi-path components are essentially time-delayed variants of a single signal. While, in some applications, these multiple components may result in interference, e.g., ghosting on the display of an analog television receiver, Code Division Multiple Access (CDMA) systems intentionally make use of these multiple components.

The basic principle of CDMA systems is orthogonal coding, whereby, instead of assigning specific frequencies or time slots to each user of a system, the users are distinguished from one another by assigning codes. The codes fulfill the same role as frequency or time in frequency or time-division systems, i.e., to keep the signals for different users from interfering with one another. In orthogonal spreading, a symbol is XOR-multiplied by a defined bit sequence called a code. If the code length is n bits, each symbol is transformed to n so-called chips. The resulting chip rate, i.e., the number of bits per second (chips per second) used in the spreading signal, is n times the original symbol rate (number of symbols per second). For example, the spreading code 1111 has a length, also called a spreading factor (SF) or Orthogonal Variable Spreading Factor (OVSF), of four. A single 1 will be spread to the sequence 0000 (1 XOR'ed with 1 gives 0), and a single 0 will be spread to the sequence 1111. In general, codes are not arbitrarily chosen, but rather, selected according to certain mathematical rules that provide sets of codes that are orthogonal to each other. Orthogonal codes have no correlation. Consequently, signals spread with codes that are orthogonal to each other do not interfere with one another. For a single connection, input data is spread with a particular code at the transmitter end. To recover the data, the same orthogonal code is used at the receiver end to despread the signal.

In the Wideband CDMA (WCDMA) standard, data symbols are spread using high-frequency bit sequences that are specifically selected so as to have properties that allow the resulting signal to be distinguished from a delayed version of itself. This property makes it possible to receive signals from a set of component paths with different delays and combine them, resulting in improved reliability and performance. A rake receiver carries out this method by employing several correlators, each referred to as a finger. A rake receiver takes data from a digital radio front-end after conversion down to a baseband sample rate and despreads the signal down to the symbol rate. Since the signal from the user can take multiple paths to the receiver, the fingers of the receiver operate such that the resulting outputs can be combined to form one signal at the symbol rate. Thus, the system takes advantage of the multiple paths to achieve a higher performance than a single despreader, resulting in increased signal-to-noise ratio at the receiver, improved receive signal strength, and decreased fading due to poor channel quality.

Referring now to FIG. 1, a block diagram illustrating the structure of an exemplary prior-art rake receiver 100 is provided. As shown, rake receiver 100 has four identical fingers 101-0 to 101-3, each of which collects energy for a particular multi-path component of the received signal and then compensates for the delay of that multi-path component. During every chip period, each of fingers 101-0 to 101-3 handles a different data sample from the input multi-path stream. The input data sequence is typically over-sampled (e.g., 8×, which means there can be 8 samples in every chip period). Each finger represents one multi-path component and will start to process its respective data sample at a different time, since the multi-path components have different delays.

The first finger 101-0 has a despreader/descrambler 102-0, a time controller 103-0, a code generator 104-0, a delay compensator 105-0, and a multiplier 106-0. Time controller 103-0 provides a clock signal to control the timing of the operations performed by despreader/descrambler 102-0 and code generator 104-0.

In addition to despreading, receiver 100 also performs descrambling operations on the signal to account for the signal having been scrambled at the transmitter. Scrambling is typically performed using a pseudorandom noise (PN) code sequence, which results in a sequence appearing as random noise to a receiver that does not have the identical code sequence. Accordingly, code generator 104-0 produces a spreading sequence and a descrambling sequence, one bit per chip, and provides these sequences to despreader/descrambler 102-0. Despreader/descrambler 102-0 (i) receives the input stream signal, the clock signal from time controller 103-0, and the spreading and descrambling sequences from code generator 104-0, (ii) demodulates the multi-path signal by performing the appropriate despreading, descrambling, filtering (to remove noise), and possibly other operations, and (iii) provides an output signal to delay compensator 105-0.

Another operation performed by receiver 100 is deskewing the signal. Deskewing accounts for each path in the propagation channel imposing a different time delay on the signal by aligning the despread signals the multiple fingers in time. Delay compensator 105-0 deskews the demodulated signal based on information from channel configuration circuitry (not shown) and provides the deskewed signal to multiplier 106-0.

Multiplier 106-0 performs channel correction by multiplying the value of each of the de-spread symbols by the corresponding weight coefficient W0 of the multi-path channel-estimation amplitude, which is provided by a channel estimator (not shown), and outputs the weighted signal.

Following this multiplication process, the symbol data is provided to combiner 107, which accumulates the corrected symbol data from all of fingers 101-0 to 101-3 and outputs a signal representing a clean symbol-rate sequence that can be used as a decision statistic by additional hardware (not shown).

The structure of each of the second finger 101-1, third finger 101-2, and fourth finger 101-3 is the same as that of the first finger 101-0, and fingers 101-0 to 101-3 all function in the same manner.

As can be seen in the exemplary rake receiver 100 of FIG. 1, due to the number of operations that it performs and the multiple instances of each operation necessitated by the plurality of fingers, the hardware of a typical rake receiver is relatively complex. Moreover, a typical rake receiver requires a large amount of hardware area and dissipates a relatively large amount of power because of its multiple fingers.

Turning now to FIG. 2, one solution to the problem of hardware size involves implementing a time-multiplexing scheme with a hardware engine that time-multiplexes among the finger components. As shown, rake receiver 200 has a rake finger block 201, a code generator 202, an address generator 203, a multiplexing information table 204, a table entry generator 205, a sampling buffer 206, and an output buffer 207. Instead of using a large number of (e.g., 16) physical rake fingers, rake receiver 200 uses rake finger block 201, which includes circuitry for a smaller number of physical rake fingers (e.g., 4), with each finger being time-multiplexed a number of (e.g., 4) times, so as to provide the larger number of logical rake fingers. A single code generator 202 supplies OVSF and scrambling code sequences to the fingers of block 201. These sequences are generated, in part, using address generator 203 and multiplexing information table 204, which table contains configuration information including the position of the desired subchip (here, a subchip is ¼ of a chip period) and a counter for storing code offsets for each logical finger. Table entry generator 205 generates the entries for multiplexing information table 204.

In operation, input samples from an A/D converter are received at and stored in sampling buffer 206 pending decoding by the appropriate logical fingers of finger block 201, and the resulting decoded symbols are provided to output buffer 207, which outputs the symbols to rate determination circuitry (not shown) and a Viterbi decoder (not shown). In this scenario, samples of all (in this case, four) of the multi-path components of the multi-path signal are processed in parallel during a single chip period.

In this prior-art time-multiplexing scheme, one chip period is divided into four subchip periods, with each finger being assigned a subchip period to process one data sample at a time, such that all fingers perform their processing within a single chip period. A higher clock rate may be required to guarantee that there will be enough clock cycles for all of the fingers to complete their respective demodulation tasks (i.e., despreading, descrambling, accumulating, and filtering) within a given chip period when data corresponding to a number of chips equal to the spread factor has been accumulated into symbol data. In this scheme, certain chip periods will experience heavy traffic (i.e., to fulfill all demodulation tasks), while others will have lighter traffic (e.g., despreading, descrambling, and accumulating only). Accordingly, the bandwidth usage may be uneven. Moreover, this implementation still typically involves the dissipation of substantial power due to the high-frequency clock rate.

SUMMARY OF THE INVENTION

Problems in the prior art are addressed in accordance with the principles of the present invention by replacing multiple physical finger instances with simplified fingers that are time-multiplexed to process each of the path components during a different processing cycle, so that the multiple fingers can share the same demodulating hardware engine. A processing cycle is a chip period, defined by the chip rate. Different chip periods are assigned to different fingers, so that each finger processes its own received data using the shared demodulating hardware. In the chip period assigned to a particular finger/path, multiple received bits (equal to the number of fingers sharing the same hardware) for that finger are demodulated to "catch up" with those "missing" chip periods that were assigned to demodulate other fingers/paths. An input sample buffer is used to store received chip data for a given finger before the data is demodulated.

In one embodiment, the present invention provides a rake receiver for processing a multi-path input signal received from a communications channel. Each multi-path component of the multi-path input signal comprises one or more symbols. The rake receiver comprises a plurality of fingers and a demodulator. Each of the plurality of fingers is adapted to receive the multi-path input signal and provide a sequence of input samples corresponding to a multi-path component of the multi-path input signal. The demodulator is adapted (i) during a single clock period, to receive and process one or more input samples corresponding to only one of the fingers, (ii) for each of the fingers, to accumulate multiple processed input samples to form a symbol, and (iii) to provide the formed symbols for all fingers.

In another embodiment, the present invention provides a method for processing a multi-path input signal received from a communications channel. Each multi-path component of the multi-path input signal comprises one or more symbols. The method comprises: (a) receiving the multi-path input signal; (b) providing a plurality of sequences of input samples, each sequence corresponding to a multi-path component of the multi-path input signal; (c) during a single clock period, receiving and processing one or more input samples corresponding to only one of the multi-path components; (d) repeating step (c) for each of the multi-path components; (e) for each of the multi-path components, accumulating multiple processed input samples to form a symbol; and (f) providing the formed symbols for all multi-path components.

In a further embodiment, the present invention provides an apparatus for processing a multi-path input signal received from a communications channel. Each multi-path component of the multi-path input signal comprises one or more symbols. The apparatus comprises: (a) means for receiving the multi-path input signal; (b) means for providing a plurality of sequences of input samples, each sequence corresponding to a multi-path component of the multi-path input signal; (c) means for receiving and processing, during a single clock period, one or more input samples corresponding to only one of the multi-path components; (d) means for activating means (c) for each of the multi-path components; (e) means for accumulating, for each of the multi-path components, multiple processed input samples to form a symbol; and (f) means for providing the formed symbols for all multi-path components.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 8 is a timing diagram illustrating a comparison between the timing of the prior-art rake receiver of FIG. 2 and the rake receiver of FIG. 3.

DETAILED DESCRIPTION

Figure 3:
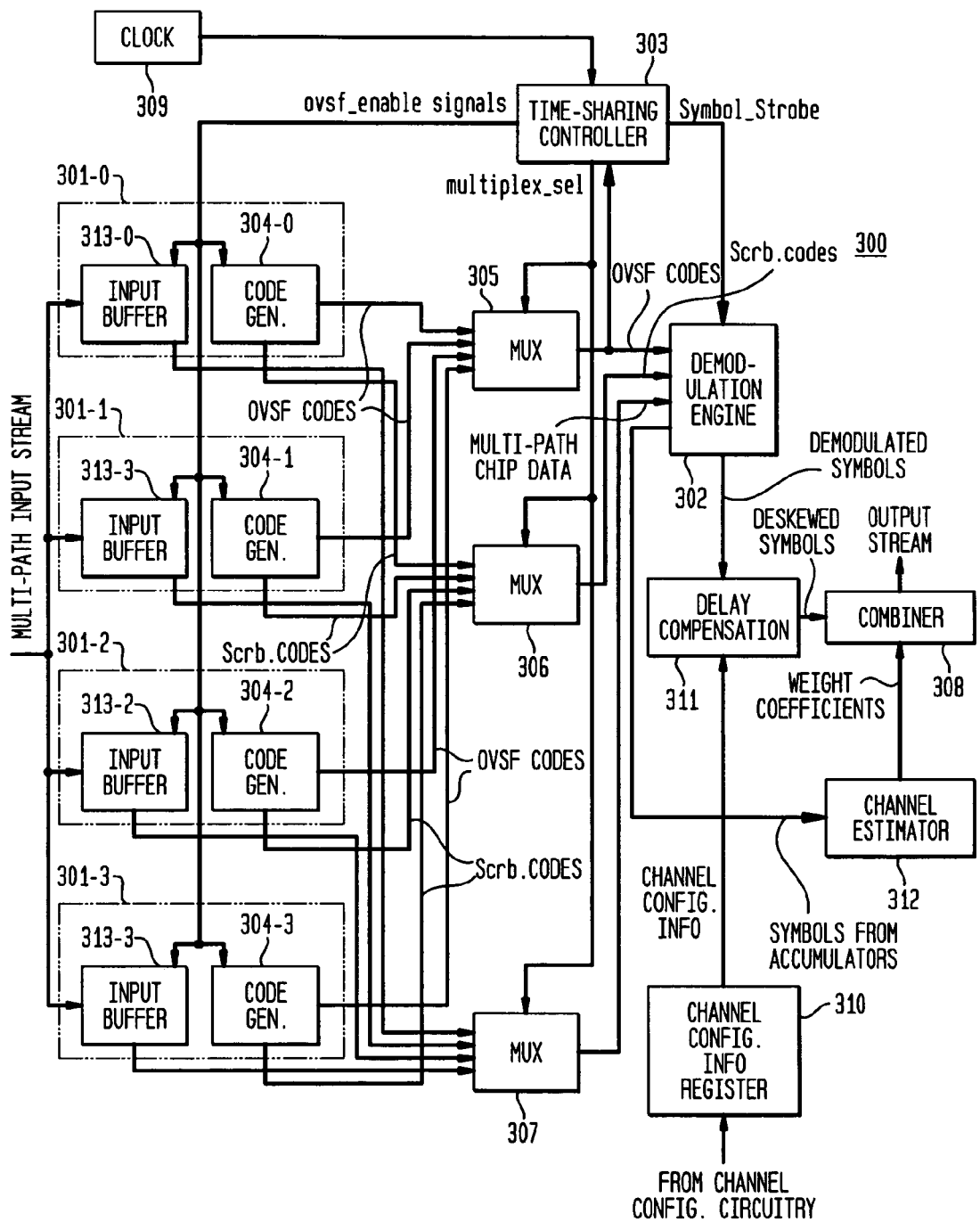
FIG. 3 is a block diagram illustrating the structure of an exemplary rake receiver consistent with one embodiment of the present invention.

FIG. 3 is a block diagram illustrating the structure of an exemplary rake receiver 300 consistent with one embodiment of the present invention. As shown, rake receiver 300 has four fingers 301-0 to 301-3, each of which collects energy for a particular multi-path component of the received signal. Unlike the prior art, it should be noted that fingers 301-0 to 301-3 do not include any hardware for demodulation, descrambling, despreading, or filtering, since these operations are instead (preferably although not necessarily) performed at a single demodulation engine 302, which is shared by all four fingers 301-0 to 301-3. If despreading is to be performed at the demodulation engine 302, then an input sample will contain multiple chips. During each chip period, all four fingers are active and simultaneously process a single data sample from the multi-path signal. However, the outputs of the fingers are multiplexed so as to provide chip data from only one finger at a time to demodulation engine 302. Rake receiver 300 also comprises a time-sharing controller 303, three switching devices (e.g., multiplexers) 305, 306, 307, a combiner 308, a clock 309, a channel configuration information register 310, a delay compensation block 311, and a channel estimator 312.

Figure 4:
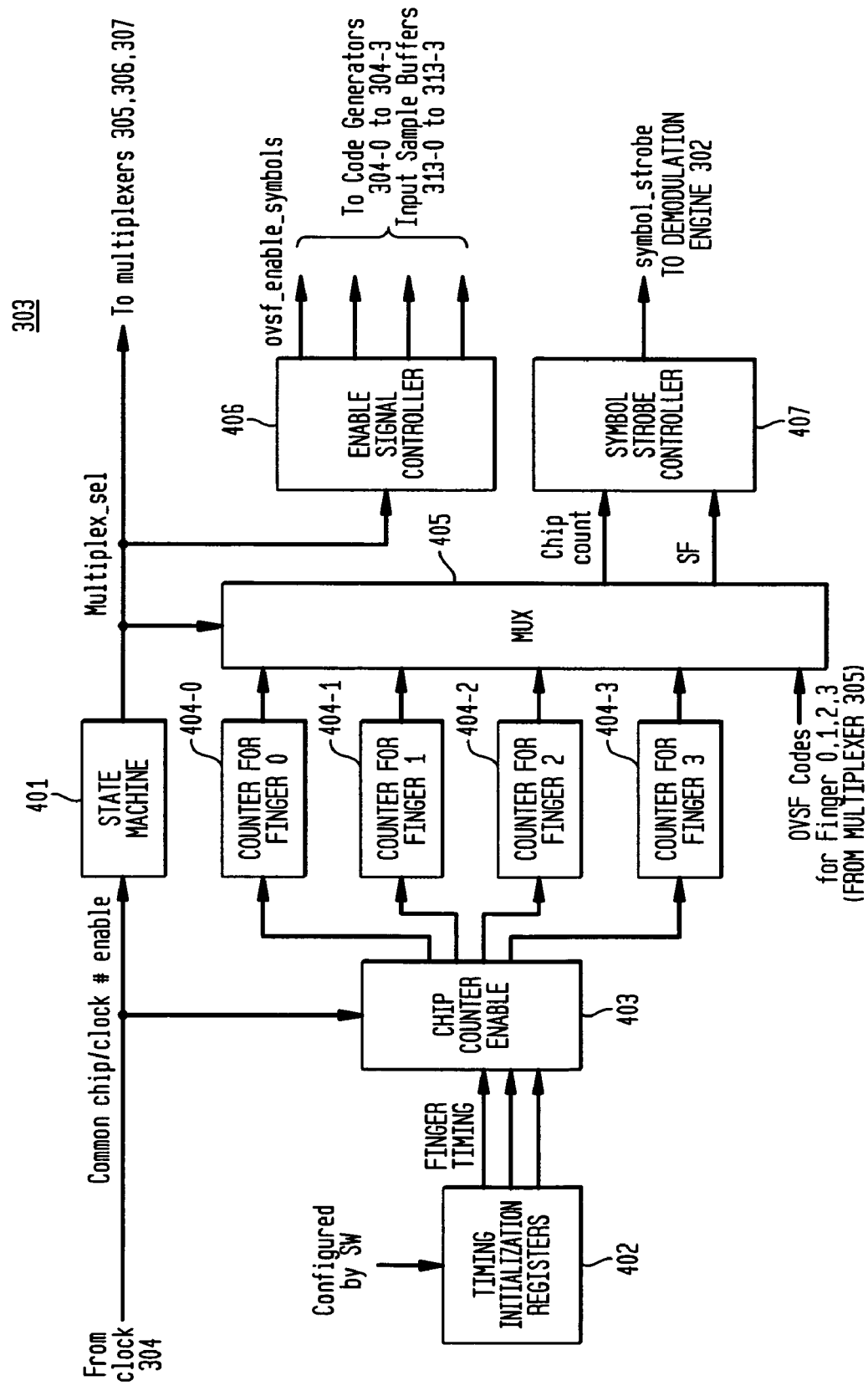
FIG. 4 is a block diagram illustrating the structure of an exemplary time-sharing controller in the rake receiver of FIG. 3.

The first finger 301-0 has an input sample buffer 313-0 and a code generator 304-0. Input sample buffer 313-0 receives the input stream signal and one or more control signals ovsf_enable from time-sharing controller 303 (although represented in FIG. 3 only by a single line, ovsf_enable may actually be four separate signals, as shown in FIG. 4) and provides an output signal to multiplexer 307. Code generator 304-0 receives control signal ovsf_enable from time-sharing controller 303 and produces OVSF (or Walsh) code sequences and descrambling (or pseudorandom noise (PN)) code sequences, which are provided to multiplexers 305 and 306, respectively. The structure of each of the second finger 301-1, third finger 301-2, and fourth finger 301-3 is the same as that of the first finger 301-0, and fingers 301-0 to 301-3 all function in the same manner.

Clock 309 provides standard system timing to time-sharing controller 303. Time-sharing controller 303 governs timing within rake receiver 300 based on the clock pulses received from clock 309 and OVSF sequences received from multiplexer 305 and outputs the following control signals: ovsf_enable for controlling the timing of input buffers 313-0 to 313-3 and code generator 304-0 to 304-3, multiplex_sel for controlling the timing of multiplexers 305, 306, and 307, and symbol_strobe for controlling the timing of demodulation engine 302.

Multiplexer 307 receives the output signals of input sample buffers 313-0 to 313-3 from all four fingers and a control signal multiplex_sel from time-sharing controller 303 and provides an output signal comprising multi-path chip data to demodulation engine 302. Multiplexer 305 receives output signals representing OVSF sequences from code generators 304-0 to 304-3 of all four fingers and control signal multiplex_sel from time-sharing controller 303 and provides an output signal comprising OVSF codes to demodulation engine 302 and time-sharing controller 303. Multiplexer 306 receives output signals representing scrambling sequences from code generators 304-0 to 304-3 of all four fingers and control signal multiplex_sel from time-sharing controller 303 and provides an output signal comprising scrambling codes to demodulation engine 302.

As will be described in further detail below, demodulation engine 302, which receives the OVSF codes from multiplexer 305, the scrambling codes from multiplexer 306, the multi-path chip data from multiplexer 307, and a control signal symbol_strobe from time-sharing controller 303, performs demodulation operations, including descrambling, despreading, and filtering. Demodulation engine 302 serially and sequentially provides a stream of multi-path output symbols, so as to represent only one path/finger at a time. For example, the symbol produced during finger 0 chip period might correspond to the first finger, the symbol produced during finger 1 chip period might correspond to the second finger, and so forth. Demodulation engine 302 provides this stream of multi-path symbols to delay compensation block 311, which deskews (i.e., time-aligns) the symbols and provides the deskewed symbols to combiner 308. Delay compensation block 311 receives channel configuration information stored in channel configuration information register 310, which receives the channel configuration information from other circuitry (not shown).

Channel estimator 312 receives symbols from demodulation engine 302 and estimates the channel phase and amplitude for each of the identified paths, using well-known techniques. This estimated information, once known, is provided to combiner 308 as a set of weight coefficients, which combiner 308 uses for combining the multi-path components of the received signal. One or more buffers (not shown) may be provided within delay compensation block 311, within combiner 308, or between delay compensation block 311 and combiner 308, so that the received signal can be buffered until the deskewed signals from all signal path components are received and then processed.

Combiner 308 receives the symbols obtained via the multiple paths, multiplies these symbols by the respective weight coefficients received from channel estimator 312, and combines the weighted symbols linearly, using a well-known combining scheme, e.g., maximum ratio combining (MRC), thereby producing a stream of output symbols. Accordingly, the output symbol stream provided by combiner 308 has an instantaneous output signal-to-noise ratio that has been optimized by the rake receiver's exploitation of the spatial diversity strategy.

With reference now to FIG. 4, an exemplary implementation of time-sharing controller 303 of rake receiver 300 of FIG. 3 is illustrated. Time-sharing controller 303 includes a state machine 401, one or more timing initialization registers 402, a chip counter enable controller 403, four chip/slot counters 404-0 to 404-3 (one for each finger), a multiplexer 405, an enable symbol controller 406, and a symbol strobe controller 407. State machine 401, which controls the time-sharing scheme among all of fingers 301-0 to 301-3, receives a common chip/clock number enable signal from clock 309 of FIG. 3 and provides multiplex selection signal multiplex_sel to multiplexer 405, enable signal controller 406, and multiplexers 305, 306, and 307 of FIG. 3. Timing initialization registers 402 receive configuration data from software (not shown) and provide four finger timing signals to chip counter enable controller 403. The software writes the configuration data into the registers in hardware through a CPU (e.g., a DSP or microprocessor), and the configuration data represent the offsets to the common system timing, one for each finger. Timing initialization registers 402 contain the timing information for the four fingers, which information is used as offsets to the common chip number counted in state machine 401.

Chip counter enable controller 403 receives the signals from timing initialization registers 402 and the common chip/clock number enable signal from clock 309, compares the common chip number to each finger's timing offset, and outputs four corresponding control signals for triggering a set of counters 404-0 to 404-3, one signal/counter corresponding to each finger. The outputs from counters 404-0 to 404-3 are provided to multiplexer 405, which selects the appropriate counter from among counters 404-0 to 404-3 based on the multiplex_sel signal received from state machine 401.

Multiplexer 405, which also receives the OVSF codes from multiplexer 305 of FIG. 3, provides a chip count signal and the corresponding spreading factor signal to symbol strobe controller 407. Strobe controller 407 generates a symbol_strobe signal indicating the symbol time for the finger that corresponds to the spreading factor signal and provides the symbol_strobe signal to demodulation engine 302 of FIG. 3. Enable signal controller 406 receives the multiplex_sel signal from state machine 401 and outputs one or more OVSF code enable signals ovsf_enable, which are provided to and control the timing of code generators 304-0 to 304-3 and input sample buffers 313-0 to 313-3 of FIG. 3. Although shown as a single signal in FIG. 3, the ovsf_enable signal may comprise a single signal or a plurality of signals.

Figure 5:
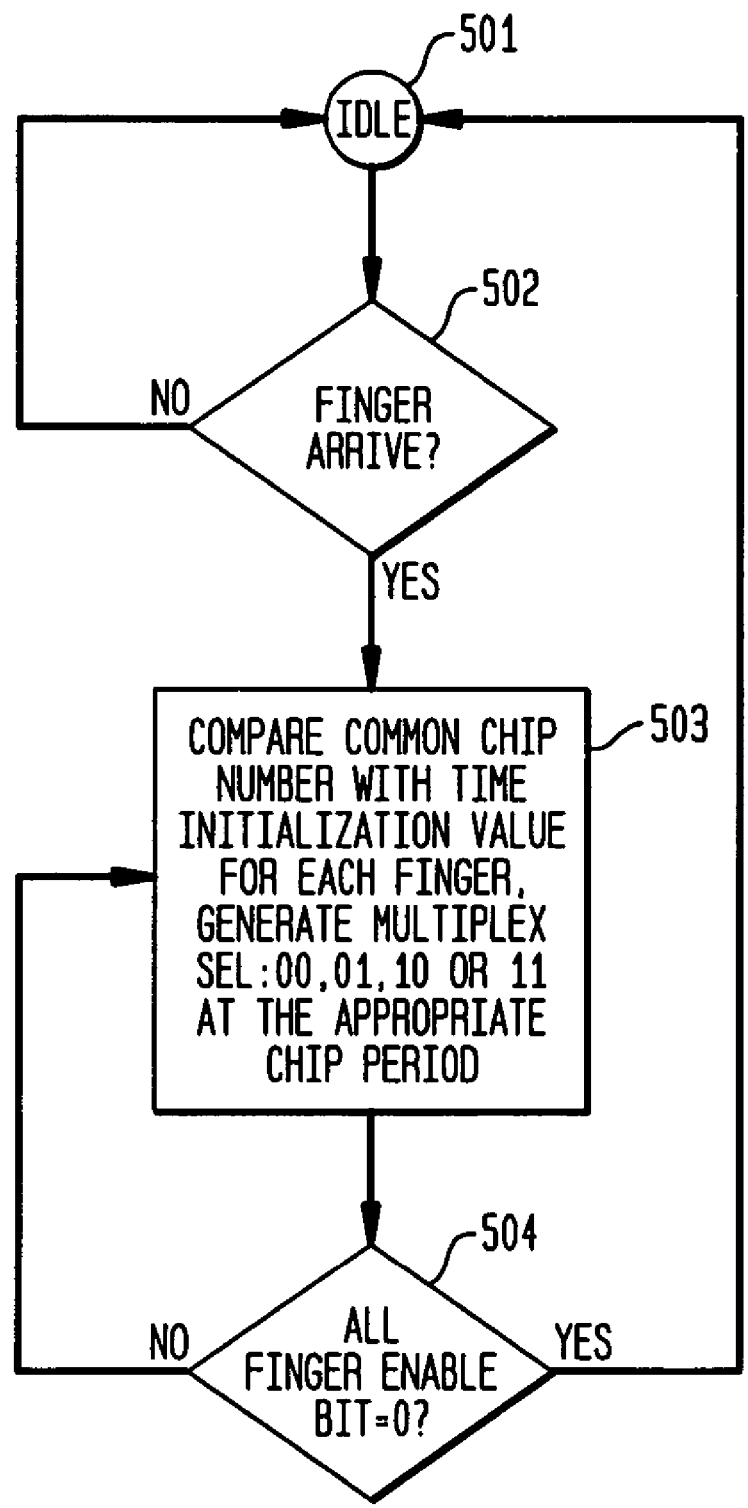
FIG. 5 is a flow diagram illustrating the processing in the time-sharing controller of the rake receiver of FIG. 3.

With reference now to the flow diagram of FIG. 5, the processing of exemplary state machine 401 of FIG. 4 is depicted. The state machine detects the starting time of the multi-path signals and configures the corresponding information into four registers (not shown), one for each finger. The state machine starts to operate as soon as the earliest multi-path signal arrives and generates the appropriate multiplex_sel signal to control the timing of code generators 304-0 to 304-3 and input sample buffers 313-0 to 313-3 of FIG. 3 for each of the fingers, as well as the timing of multiplexer 405 of FIG. 4.

As shown in FIG. 5, state machine 401 begins in an idle state (block 501). Next, a determination is made (block 502) whether data for a finger has arrived. If no data has arrived, then state machine 401 returns to the idle state (block 501). If data has arrived, then state machine 401 (i) compares the common chip number with the time initialization value for each finger, and (ii) generates the multiplex_sel signal (e.g., 00, 01, 10, or 11) for the corresponding finger at the appropriate chip period (block 503). Next, a determination is made (block 504) whether the bit values of the ovsf_enable signals for all fingers are equal to 0, in which case, state machine 401 returns to the idle state (block 501). If the ovsf_enable signal bit values for all fingers are not equal to 0, then state machine 401 returns to block 503 to continue generating additional multiplex_sel signals.

Figure 6:
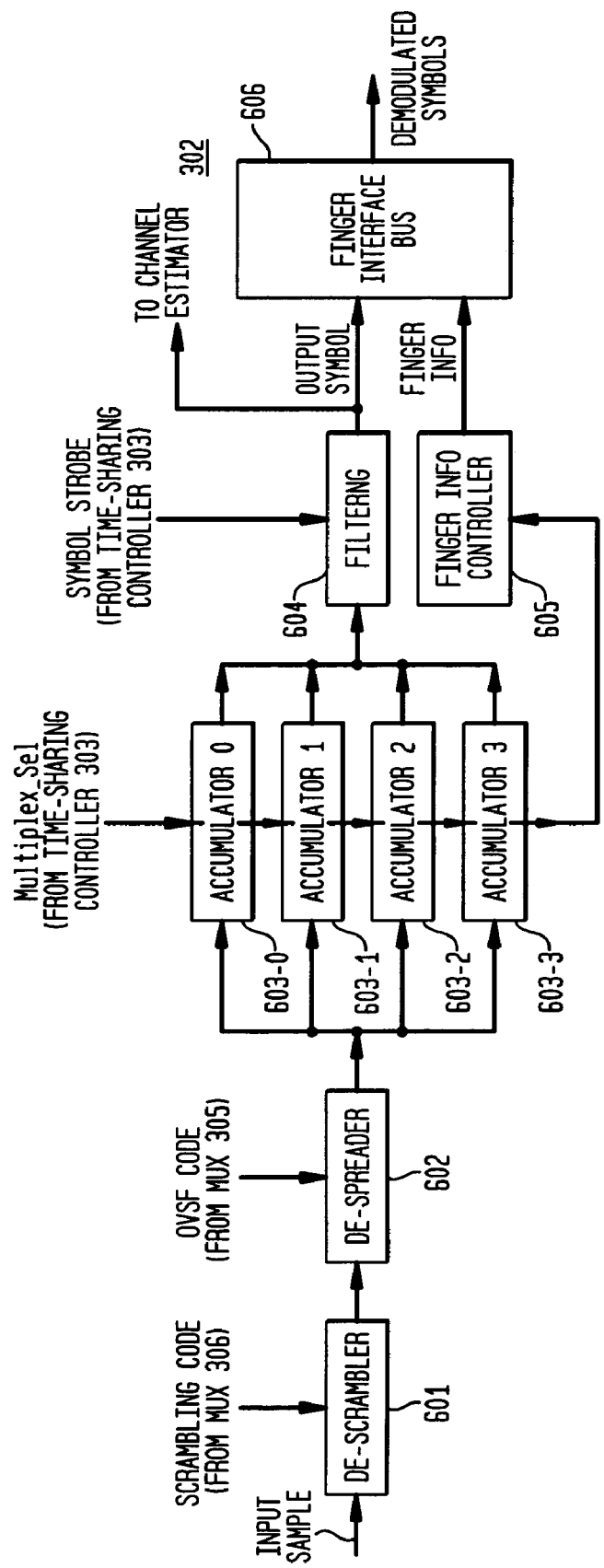
FIG. 6 is a block diagram illustrating the structure of an exemplary demodulation engine in the time-sharing controller of the rake receiver of FIG. 3.

Turning now to FIG. 6, demodulation engine 302 of rake receiver 300 of FIG. 3 is illustrated. Demodulation engine 302 includes a descrambler 601, a despreader 602, four independent accumulators 603-0 to 603-3 (one for each finger), a filter 604, a finger information controller 605, and a finger interface bus 606. Descrambler 601 receives input samples at chip rate from multiplexer 307 and scrambling codes from multiplexer 306 of FIG. 3, descrambles the input samples, and provides the descrambled input samples at chip rate to despreader 602. Despreader 602 receives the descrambled input samples from descrambler 601 and OVSF codes from multiplexer 305 of FIG. 3, despreads the descrambled input samples, and provides, at chip rate, the despread, descrambled input samples, one to each of accumulators 603-0 to 603-3 at a time based on which accumulator is selected by the multiplex_sel signal.

Each of accumulators 603-0 to 603-3 receives the despread, descrambled input samples at chip rate from despreader 602 and the multiplex_sel signal from state machine 401 of FIG. 4. Each of accumulators 603-0 to 603-3 is used to concatenate multiple input samples for one finger to form a symbol, which is provided at symbol rate to filter 604.

As in the case of input buffers 313-0 to 313-3 of FIG. 3, the multiplex_sel signal is used to select the accumulator that corresponds to the current finger (301-0 to 301-3 of FIG. 3). The size of the accumulators 603-0 to 603-3 depends on the precision of the input sample. To obtain one symbol, a plurality of input samples will be de-scrambled, despread, and accumulated over a number of samples equal to the spread factor (SF). Filter 604 receives one of the symbols from each of accumulators 603-0 to 603-3 at a time, based on which accumulator is selected by the multiplex_sel signal, filters the symbol to mitigate noise, and provides the corresponding filtered output symbol to finger interface bus 606 and to channel estimator 312 of FIG. 3.

Finger information controller 605 receives the multiplex_sel signal from state machine 401 of FIG. 4 and provides a finger information signal to finger interface bus 606. The finger information signal, which indicates which one of the fingers corresponds to the current output symbol being provided by filter 604, is employed because demodulation engine 302 of FIG. 3 is shared by all of the fingers. Finger interface bus 606 receives the output symbol from filter 604 and the finger information signal from finger information controller 605 and provides a finger bus signal representing a multi-path symbol to delay compensation block 311 of FIG. 3. The finger bus signal includes a plurality of (e.g., 2) information bits indicating the finger from which a given symbol originated, as well as the symbol itself (e.g., 10 bits). The information bits are used by delay compensation block 311 in identifying the origin of each arriving symbol. Similar information bits may be provided by delay compensation block 311 to combiner 308 to assist combiner 308 in identifying the origin of each arriving symbol. However, the output of combiner 308 does not include such information bits, since combiner 308 ultimately outputs a "cleaned," combined multi-path signal.

Figure 7:
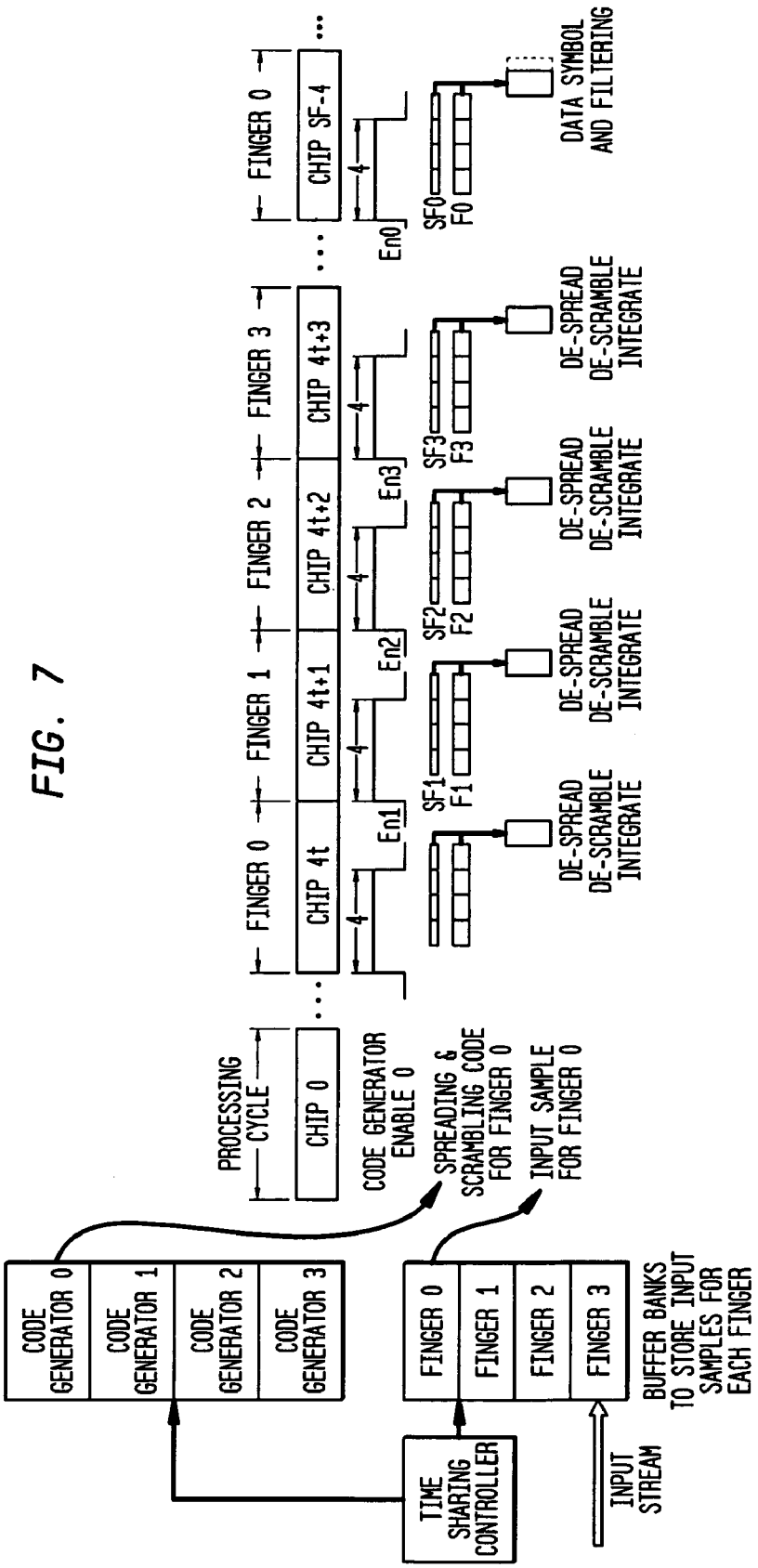
FIG. 7 is a combined process flow/timing diagram illustrating an exemplary mode of operation of the rake receiver of FIG. 3.

Referring now to FIG. 7, a combined process flow/timing diagram illustrating an exemplary mode of operation of rake receiver 300 of FIG. 3 is provided. In a WCDMA communications system, the spreading factor for the received signal is $4 \times 2^n$, where n is a non-negative integer. For example, if the spreading factor in rake receiver 300 is 4, then the received signal will be despread into one symbol for every 4 received chips. One processing cycle is a chip period, and the chip period is counted and governed by time-sharing controller 303 of FIG. 3, which provides a common timing for rake receiver 300. Each finger 301-0 to 301-3 also has its own internal timing system to record the assigned path's chip, symbol, slot, and/or frame. In other words, each finger might start processing at a different time, depending on its multi-path delay. A common chip counter counts the chip period (e.g., 0, 1, 2, 3, etc.) for managing the chip period assignment for each finger. For each finger, its own internal timer also serves as a chip counter, which starts when the finger is active. For example, if a given finger is assigned to chip period $4t+1$, which means chip periods 1, 5, 9, 13, etc. are allotted to the finger, but the finger does not actually start to operate until chip period 5, then its own internal timing system will be active beginning at chip period 5 and during subsequent chip periods 9, 13, 17, etc.

As shown in FIG. 7, the four fingers 301-0 to 301-3 take turns processing their assigned path components every 4 chip periods. In particular, chip $4t$ is reserved for Finger 0 (301-0) processing, chip $4t+1$ is reserved for Finger 1 (301-1) processing, chip $4t+2$ is reserved for Finger 2 (301-2) processing, and chip $4t+3$ is reserved for Finger 3 (301-3) processing. Since each finger has its own code generator for generating scrambling and OVSF codes, the codes for each of fingers 301-0 to 301-3 can be different from one another, which is desirable if the multi-path signals are coming from different channels. As a practical matter, different code generators might be necessary for different fingers, even if they are from the same channel, because of different multi-path delay among the fingers. However, if the data samples for each finger are de-skewed before demodulation (e.g., using a pre-demodulation deskew mechanism similar to delay compensation block 311), one code generator might be enough for all fingers coming from the same channel.

The starting chip period for each finger is determined by the delay of its assigned path. Before a finger's processing chip period, the data samples for its assigned path will be stored in memory, and four input samples at a time (assuming a spread factor of four) will be processed within the finger's chip period. As shown in FIG. 7, the code generator enable signal ovsf_enable is used to control the timing of this processing so that four chips at a time are processed by demodulation engine 302.

For example, if a given path A is assigned to Finger 1, whose processing chip period is chip $4t+1$, and path A starts at chip 1, then the data samples for path A will be stored in the input buffer for Finger 1 as soon as they arrive. If the spread factor for Finger 1 is 4, then the data samples received at chips 1, 2, 3, and 4 will be descrambled, despread, and filtered at chip 5, resulting in a despread symbol. Different multi-path components for the receiver system are assigned to different fingers according to their different delays, so that they can be processed within different chip periods.

Figure 1:
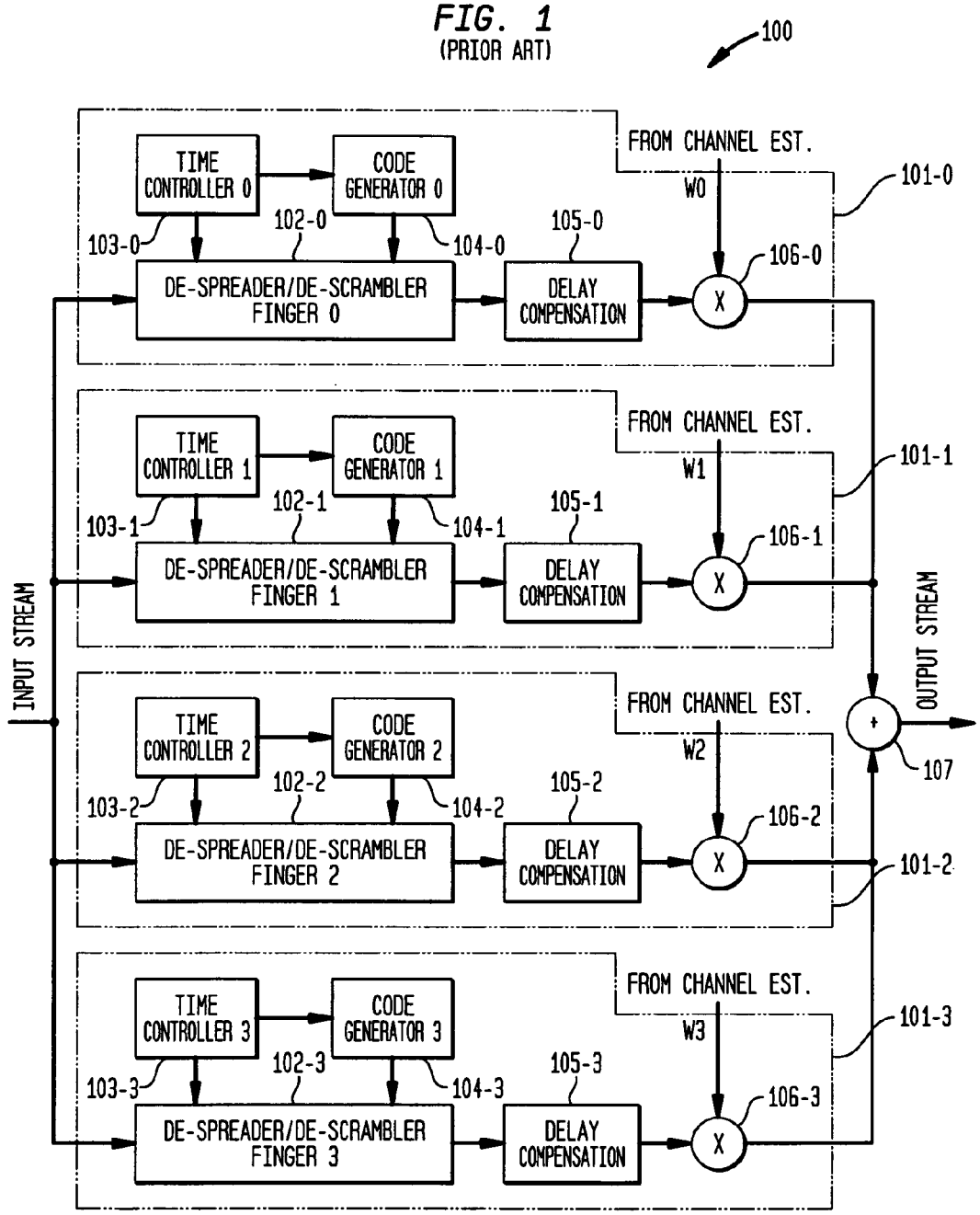
FIG. 1 is a block diagram illustrating the structure of an exemplary prior-art rake receiver.
Figure 2:
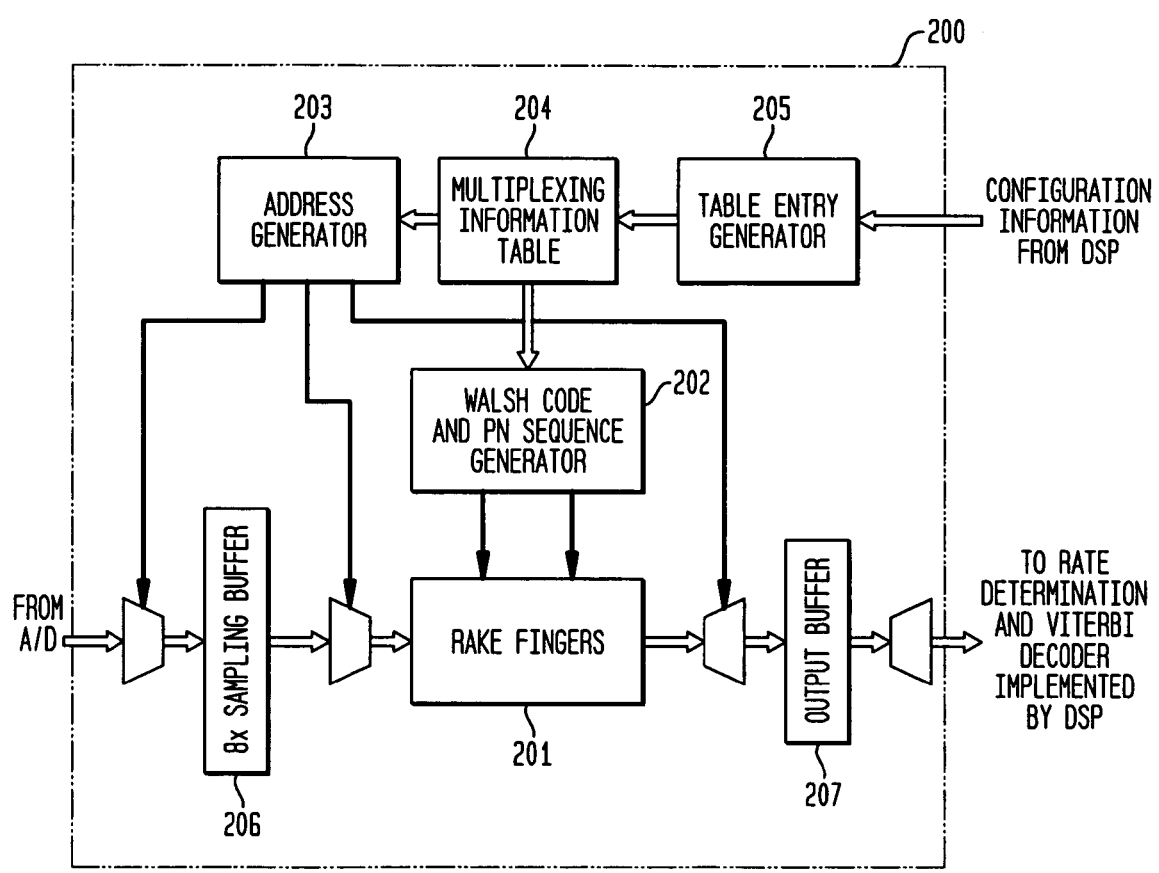
FIG. 2 is a block diagram illustrating the structure of another exemplary prior-art rake receiver.

With reference to FIG. 8, a comparison between the timing of the prior art time-multiplexed rake receiver of FIG. 2 and the exemplary rake receiver of FIG. 3 is provided. As discussed above, in this prior-art time-multiplexing scheme, one chip period is divided into four subchip periods, with each finger f0-f3 being assigned a subchip period to process one data sample at a time, such that all fingers f0-f3 perform their processing within a single chip period. A higher clock rate may be required to guarantee that there will be enough clock cycles for all of the fingers to complete their respective demodulation tasks (i.e., despreading, descrambling, accumulating, and filtering) within a given chip period when data corresponding to a number of chips equal to the spread factor has been accumulated into symbol data. In this scheme, certain chip periods will experience heavy traffic (i.e., to fulfill all demodulation tasks), while others will have lighter traffic (e.g., despreading, descrambling, and accumulating only). Accordingly, the bandwidth usage may be uneven. To the contrary, in the rake receiver of FIG. 3, the fingers are managed so that the samples for each finger are processed in different chip periods. In this scenario, even if the full demodulation process needs to be performed within a single chip period, traffic will not be increased by a factor of four, as in the prior art, and it is possible to use a normal clock rate.

It should be understood that embodiments of the present invention described herein as employing four fingers sharing a hardware engine are merely exemplary, and that different numbers of fingers could be used. For example, eight fingers could share demodulation engine 302 of FIG. 6 by using a doubled clock rate. Alternatively, a demodulation engine that processes eight samples in a single chip period could operate at the single-chip clock rate. It should also be recognized that the present invention may be implemented in rake receivers for multi-path applications other than WCDMA, and that hardware configurations other than those described herein, consistent with various embodiments of the present invention, are possible.

While the demodulation engine is described herein as performing despreading, descrambling, and filtering operations, in certain embodiments, the demodulation engine might not perform all of the foregoing operations. It should also be recognized that the foregoing operations might be implemented in other hardware configurations, including non-shared implementations for one or more, but not all, of these functions. For example, one or more of the descrambler, the despreader, the accumulators, and the filter might be implemented as separate components from one another and/or from the demodulation engine.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing steps in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

I claim:

1. A rake receiver for processing a multi-path input signal received from a communications channel, each multi-path component of the multi-path input signal comprising one or more symbols, the rake receiver comprising:

a plurality of fingers, each adapted to receive the multi-path input signal and provide a sequence of input samples corresponding to a multi-path component of the multi-path input signal; and a demodulator adapted (i) during a single clock period, to receive and process one or more input samples corresponding to only one of the fingers, (ii) for each of the fingers, to accumulate multiple processed input samples to form a symbol, and (iii) to provide the formed symbols for all fingers, wherein the demodulator comprises an accumulator for each finger, each accumulator adapted (i) to accumulate the processed input samples for the finger and (ii) to output a symbol corresponding to the accumulated processed input samples.

2. The invention of claim 1, wherein each finger further comprises at least one code generator adapted to generate and provide to the demodulator at least one code sequence for demodulating one or more of the input samples provided by the finger.

3. The invention of claim 2, wherein:
the code sequence is a descrambling sequence; and
the demodulator comprises a descrambler adapted to descramble the one or more input samples using the descrambling sequence.

4. The invention of claim 2, wherein:
the code sequence is a despreading sequence; and
the demodulator comprises a despreader adapted to despread the one or more input samples using the despreading sequence.

5. The invention of claim 2, wherein:
the at least one code sequence includes a descrambling sequence and a despreading sequence;
the demodulator comprises a descrambler adapted to descramble the one or more input samples using the descrambling sequence; and
the demodulator comprises a despreader adapted to despread the one or more input samples using the despreading sequence.

6. The invention of claim 1, wherein each finger further comprises at least one input buffer adapted to store one or more of the input samples.

7. The invention of claim 1, further comprising a controller adapted to cause one or more input samples from one of the fingers at a time to be provided to the demodulator.

8. The invention of claim 1, wherein each input sample comprises a plurality of chips.

9. The invention of claim 1, wherein the demodulator is adapted to time-multiplex the processing of input samples corresponding to the plurality of fingers.

10. The invention of claim 1, wherein the demodulator is adapted to process (i) input samples for only a first finger during a first clock period and (ii) input samples for only a second finger during a second clock period different from the first clock period.

11. A rake receiver for processing a multi-path input signal received from a communications channel, each multi-path component of the multi-path input signal comprising one or more symbols, the rake receiver comprising:
a plurality of fingers, each adapted to receive the multi-path input signal and provide a sequence of input samples corresponding to a multi-path component of the multi-path input signal;
a demodulator adapted (i) during a single clock period, to receive and process one or more input samples corresponding to only one of the fingers, (ii) for each of the fingers, to accumulate multiple processed input samples to form a symbol, and (iii) to provide the formed symbols for all fingers; and
a switching device controlled by the controller to select one of the fingers to provide one or more input samples to the demodulator.

12. The invention of claim 11, wherein:
each finger further comprises at least one code generator adapted to generate and provide to the demodulator at least one code sequence for demodulating one or more of the input samples provided by the finger; and
further comprising another switching device adapted to selectively connect one of the code generators to the demodulator.

13. A rake receiver for processing a multi-path input signal received from a communications channel, each multi-path component of the multi-path input signal comprising one or more symbols, the rake receiver comprising:
a plurality of fingers, each adapted to receive the multi-path input signal and provide a sequence of input samples corresponding to a multi-path component of the multi-path input signal;
a demodulator adapted (i) during a single clock period, to receive and process one or more input samples corresponding to only one of the fingers, (ii) for each of the fingers, to accumulate multiple processed input samples to form a symbol, and (iii) to provide the formed symbols for all fingers;
a delay compensation block adapted to deskew the symbols provided by the demodulator; and
a channel estimator adapted (i) to receive a plurality of symbols from the demodulator, (ii) to generate, based on the received plurality of symbols, weight coefficients representing estimated channel information for each of the multi-path components, and (iii) to provide the weight coefficients to the combiner; and
a combiner adapted to receive and combine linearly the formed symbols provided by the demodulator for all fingers;
wherein:
the delay compensation block further comprises at least one buffer adapted to store one or more of the symbols; and
the combiner is further adapted to multiply the formed symbols provided by the demodulator for each finger by the respective weight coefficients received from the channel estimator.

14. A method for processing a multi-path input signal received from a communications channel, each multi-path component of the multi-path input signal comprising one or more symbols, the method comprising:
(a) receiving the multi-path input signal;
(b) providing a plurality of sequences of input samples, each sequence corresponding to a multi-path component of the multi-path input signal;
(c) during a single clock period, receiving and processing one or more input samples corresponding to only one of the multi-path components;
(d) repeating step (c) for each of the multi-path components;
(e) for each of the multi-path components, accumulating multiple processed input samples to form a symbol; and
(f) providing the formed symbols for all multi-path components, further comprising:
generating, based on the symbols, weight coefficients representing estimated channel information for each of the multi-path components;
multiplying the symbols for each multi-path component by the respective weight coefficients; and
combining linearly the weighted symbols for all multi-path components.

* * * * *